United States Patent
Chang et al.

(10) Patent No.: US 7,206,801 B2
(45) Date of Patent: Apr. 17, 2007

(54) DIGITAL MULTIPLIER WITH REDUCED SPURIOUS SWITCHING BY MEANS OF LATCH ADDERS

(75) Inventors: Joseph Sylvester Chang, Singapore (SG); Bah Hwee Gwee, Singapore (SG); Kwen Siong Chong, Singapore (SG)

(73) Assignees: Chang, Joseph Sylvester, Singapore (SG); Gwee, Bah Hwee, Singapore (SG)

( * ) Notice: Subject to any disclaimer, the term of this patent is extended or adjusted under 35 U.S.C. 154(b) by 678 days.

(21) Appl. No.: 10/437,502

(22) Filed: May 14, 2003

(65) Prior Publication Data

US 2003/0220957 A1     Nov. 27, 2003

(30) Foreign Application Priority Data

May 22, 2002     (SG)     ............................. 200203073-2

(51) Int. Cl.
G06F 7/523     (2006.01)
(52) U.S. Cl. .................................................... 708/620
(58) Field of Classification Search ................. 708/620
See application file for complete search history.

(56) References Cited

U.S. PATENT DOCUMENTS

| | | | | |
|---|---|---|---|---|
| 3,657,635 A | * | 4/1972 | Quinn ........................ | 341/144 |
| 4,559,608 A | * | 12/1985 | Young et al. ................ | 708/702 |
| 4,982,355 A | | 1/1991 | Nishimura et al. ......... | 364/758 |
| 5,333,119 A | | 7/1994 | Raatz et al. ................ | 364/760 |
| 5,367,691 A | * | 11/1994 | Johnson ....................... | 708/710 |
| 5,448,639 A | * | 9/1995 | Arazi ........................... | 380/30 |
| 5,734,601 A | | 3/1998 | Chu ............................ | 364/760 |
| 5,787,029 A | | 7/1998 | de Angel ................ | 364/760.01 |
| 5,818,743 A | | 10/1998 | Lee et al. ............... | 364/760.01 |
| 5,924,050 A | * | 7/1999 | Maruyama .................... | 702/60 |
| 6,021,424 A | | 2/2000 | Chu ............................ | 708/630 |
| 6,898,613 B1 | * | 5/2005 | Robinson et al. ........... | 708/491 |

OTHER PUBLICATIONS

C.S. Wallace, "A Suggestion for a Fast Multiplier"; IEEE Transactions On Electronic Computers; pp. 14-17; 1964.
J.F. Wakerly, "Section 5.10 Adders, Subtractors, and ALUs"; Digital Design Principles & Practices, 3rd Ed., Prentice Hall, 2000, pp. 430-453.
W. J. Dally, et al., "Chapter 10 Synchronization"; Digital Systems Engineering, Cambridge University Press, 1998, pp. 462-513.

(Continued)

*Primary Examiner*—D. H. Malzahn
(74) *Attorney, Agent, or Firm*—Osha Liang LLP

(57) ABSTRACT

A digital Parallel Multiplier has a Partial Product Generator, a First Stage Adder Circuit and a Final Stage Adder Circuit. The spurious switching in the First Stage Adder Circuit may be substantially reduced by synchronizing the input signals to the Adders in First Stage Adder Circuit. The reduced spurious switching reduces the power dissipation of the Multiplier. The timing of the input signals is synchronized by means of the Latch Adders having a Latch that is an integral part of an Adder. Consequently, the power dissipation and hardware overheads of the Latch Adders are low. The Latch Adders may be controlled by Control Signals, which may be generated by Control Circuits. The application of the Latch Adders may be applied to the Final Stage Adder Circuit to further reduce spurious switching and thereby further reduce the power dissipation.

17 Claims, 7 Drawing Sheets

OTHER PUBLICATIONS

Fang Lu, et al., "A 200-MHz CMOS Pipelined Multiplier—Accumulator Using a Quasi-Domino Dynmic Full-Adder Cell Design"; IEEE Journal of Solid State Circuits, vol. 28, No. 2, Feb. 1993, pp. 123-132.

C. Lemonds, et al., "A Low Power 16 by 16 Multiplier Using Transition Reduction Circuitry"; International Workshop on Low Power Design, Apr. 1994, pp. 139-142.

* cited by examiner

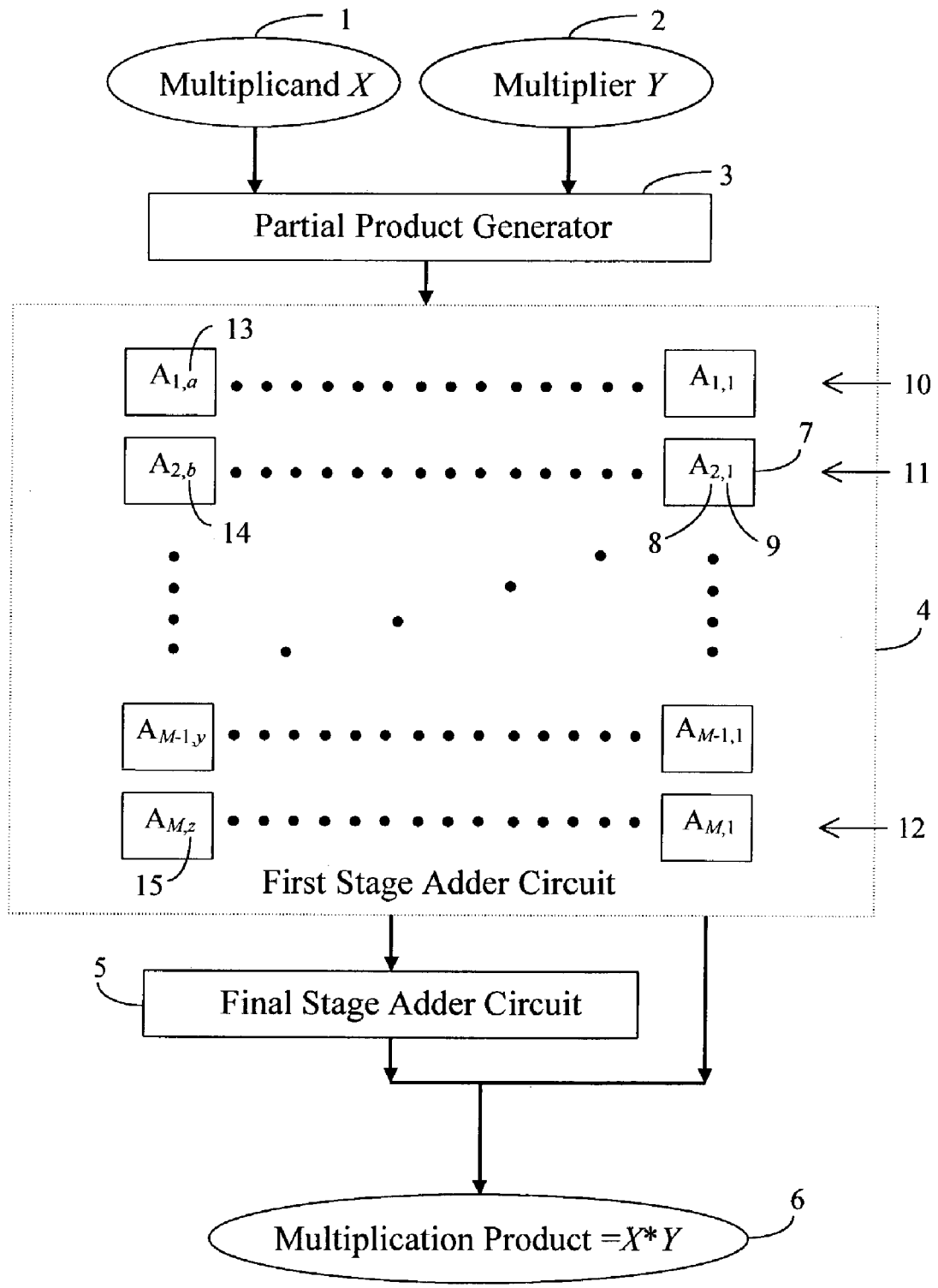
FIG. 1 (Prior-art)

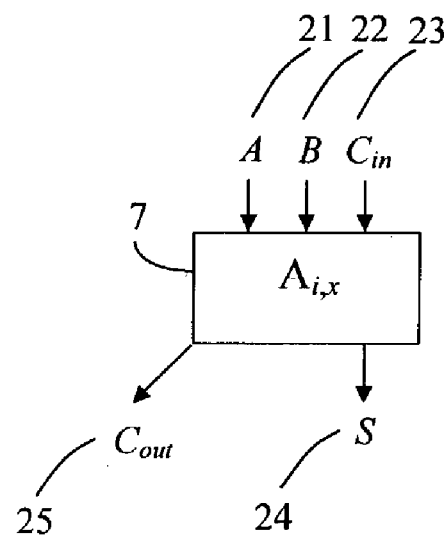
FIG. 2 (Prior-art)
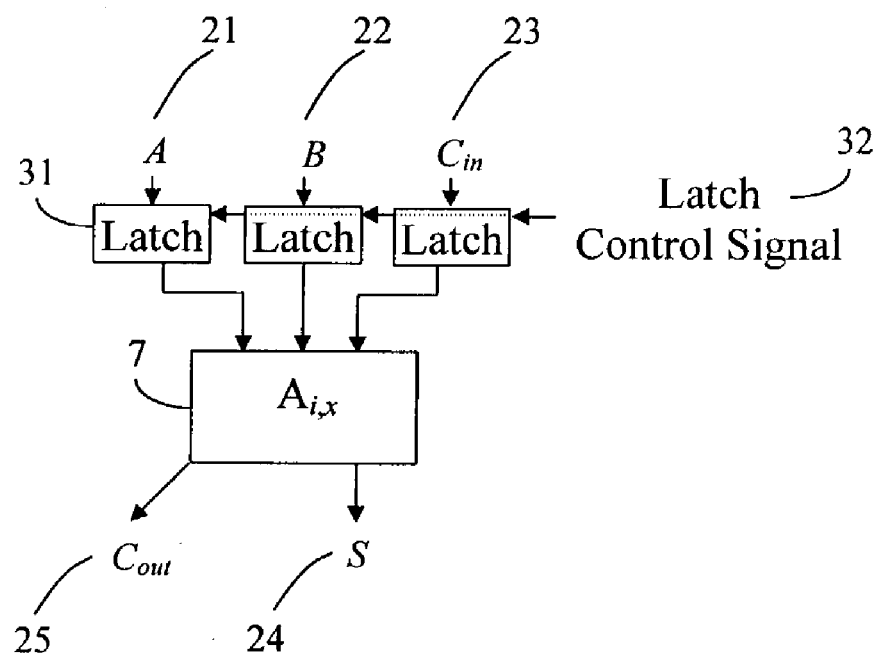
FIG. 3 (Prior-art)

DIGITAL MULTIPLIER WITH REDUCED SPURIOUS SWITCHING BY MEANS OF LATCH ADDERS

FIELD OF THE INVENTION

This invention relates to a Multiplier, and particularly to a digital Parallel Multiplier to reduce spurious switching by means of Latch Adders, thereby reducing the power dissipation.

BACKGROUND OF THE INVENTION

Many advanced existing electronic devices employ a digital signal processor to perform complex signal processing. Most digital signal processing functions require multiplication that is realized by a Multiplier, addition that is realized by an Adder, subtraction that is realized by an Adder (with simple modifications to the inputs) and in some applications, division that is realized by a Divider. All these mathematical operations involve addition that is realized by an Adder. In typical mathematically intensive computations, the Multiplier dissipates substantial power.

It is well established that the primary power dissipation mechanism of the Multiplier is the dynamic switching power that is due to the large number of high speed transistor switching within the Multiplier. This switching power problem is well recognized within the electronics industry. Generally, it is desirable that the power dissipation be as low as possible as this leads to a longer battery life for portable devices, less heat dissipation problems, etc. A well-established method to reduce the power dissipation of Multipliers is to reduce spurious switching (unnecessary transistor switching) where possible.

Multipliers may be categorized into two general classes: Serial and Parallel Multipliers. Parallel Multipliers are more popular as they have improved speeds over Serial Multipliers and they often dissipate lower power. However, their integrated circuit (IC) area requirement is usually larger but this is not usually a problem.

A Parallel Multiplier generally comprises three functional blocks as shown in FIG. 1. A Multiplicand input (X) 1 and a Multiplier input (Y) 2 are entered into a Partial Product Generator functional block 3 and the Partial Product Generator 3 generates Partial Products. The Partial Product Generator 3 can be realized by different methodologies including Booth algorithm, modified Booth algorithm, Baugh-Wooley algorithm, etc. The Partial Products are subsequently added in the First Stage Adder Circuit 4 whose internal structure is usually either array-based or tree-based. A Multiplier whose First Stage Adder Circuit 4 is based on an array structure is henceforth termed a Parallel Array Multiplier, and a Multiplier whose First Stage Adder Circuit 4 is based on a tree structure is henceforth termed a Parallel Tree Multiplier. The design of Parallel Multipliers is well established and is described in a book authored by Wakerly entitled *Digital Design—Principles* & Practices, $3^{rd}$ Edition, Prentice Hall, 2000 (Wakerly). The most popular tree-based structure is the Wallace-Tree, first proposed by Wallace in, "A Suggestion for a Fast Multiplier," *IEEE Transactions on Electronic Computers*, vol. 13, pp. 14–17, February 1964. The adders in the First Stage Adder Circuit 4 can be realized by a number of different adders including the Carry-Ripple Adder, Carry-Save Adder, Carry-Look-Ahead Adder, etc, and the Carry-Save Adder is probably the most popular design. The Adder 7 in the First Stage Adder Circuit 4 can be a Full Adder, a Half Adder or a combination of these basic adders. Wakerly gives a good description of these prior-art adders.

In FIG. 1, the first subscript 8 and a second subscript 9 of the Adder 7 respectively denote a row and a column of the Adder 7. As an illustration in FIG. 1, there are M rows of Adders 7 in the First Stage Adder Circuit 4. Depending on specific parallel structure, the number of columns in each row may be different. In the first row 10 there are a columns 13, in the second row 11 there are b columns 14, ..., and in the $M^{th}$ row 12, there are z columns 15. It is well known that the number of Adders 7 in this First Stage Adder Circuit 4 of a Parallel Array Multiplier is essentially the same for all rows. It is also well known that the number of rows of Adders 7 in the First Stage Adder Circuit 4 of a Parallel Tree Multiplier is less (than that in the Parallel Array Multiplier) and that the number of adders reduces from the first row to the last row. Consequently, the Parallel Tree Multiplier is usually faster (than the Parallel Array Multiplier) and potentially dissipates less power. However, its layout structure is less regular.

The output of the First Stage Adder Circuit 4 comprising the Partial Product additions goes to the Final Stage Adder Circuit 5. The Final Stage Adder Circuit 5 is typically one row of adders. Usually, the output of the Final Stage Adder Circuit 5 and some products from the First Stage Adder Circuit 4 collectively form the Multiplication Product 6.

The abovementioned spurious switching primarily occurs in the internal nodes of the First Stage Adder Circuit 4 and in the internal nodes of the Final Stage Adder Circuit 5. The origin of the spurious switching in the First Stage Adder Circuit 4 and in the Final Stage Adder Circuit 5 may be largely attributed to the different arrival times of input signals to the different adders. In the First Stage Adder Circuit 4, the spurious switching propagates from the nodes in the input stages of the first row to the latter rows where the amount of spurious switching usually increases substantially. Typically, the total amount of spurious switching in the Final Stage Adder Circuit 5 is substantially less than that in the First Stage Adder Circuit 4 because the Final Stage Adder Circuit 5 usually comprises a significantly smaller number of adders. However, the amount of spurious switching per adder in the Final Stage Adder Circuit 5 may be higher.

Several methods have been proposed to reduce the undesired spurious switching. For example, U.S. Pat. No. 5,333,119 Raatz et al. employs a delayed-evaluation technique where delay lines are used to appropriately time the dynamic Complementary Metal-Oxide-Semiconductor (CMOS) adders in the First Stage Adder Circuit 4. However, because the dynamic CMOS adders require constant pre-charging and evaluation of their output logic levels according to the applied inputs, the adders potentially feature higher spurious switching activity compared to the more conventional static CMOS adders. In U.S. Pat. No. 5,787,029 de Angel, applies a logic called an Enable/Disable CMOS Differential Logic (ECDL). The ECDL is used to construct the computation units including the basic adder cells that operate in an iterative manner in the First Stage Adder Circuit 4. This operation potentially reduces the intermediate spurious switching in Multipliers. However, as such ECDL adders require reset and enable operations (similar to that of the dynamic CMOS adders) to appropriately time the ECDL adders, the advantages gained are mitigated by the potentially higher spurious switching activity. Furthermore, the ECDL adders require complementary signals that double the switching activity and require a larger IC area.

Another method to reduce the undesired spurious switching is described in U.S. Pat. No. 5,818,743 Lee et al, which places a plurality of delay elements and registers in selected signal lines to delay the arrival of signals to a Booth Encoder in the Partial Product Generator 3 and to the adders in the First Stage Adder Circuit 4. This improves the synchronicity of input timings. These delay elements and registers are separate circuit entities that are independent of the adders and the Booth Encoder. Being separate circuit entities, the added hardware costs are high. Furthermore, the additional power costs from the delay elements and registers may instead increase the overall power dissipation of the Multiplier rather than reducing the power dissipation originally obtained from reduced spurious switching.

Lemonds et al., in a technical paper entitled "A Low Power 16 by 16 Multiplier Using Transition Reduction Circuitry," *International Workshop on Low Power Design*, pp. 139–142, April 1994 (Lemonds 1994), proposes placing Latches at the input of the adders in the First Stage Adder Circuit 4 and clocking the Latches in a precise sequence so that inputs to the adders are synchronized. Although the spurious switching is reduced, the overhead cost of the Latches remains high. This is because the Latches are circuit entities independent of (and separate from) the adders, as in U.S. Pat. No. 5,818,743 Lee et al. Consequently, the power savings from reduced spurious switching may be offset by the power dissipation of the Latches that are external to the adders. Furthermore, the circuit costs of these Latches in terms of IC area may also be high.

Lu et al., in a technical paper entitled "A 200-MHz CMOS Pipelined Multiplier-Accumulator Using a Quasi-Domino Dynamic Full-Adder Cell Design," *IEEE Journal of Solid-State Circuits*, vol. 28, No. 2, pp. 123–132, February 1993 (Lu 1993), proposes to include an internal $C^2MOS$ dynamic Latch at the output of all adders to perform logic inversion, buffering and pipelining functions. The objective of this proposal is to increase the throughput rate of the Multiplier. Although this design indirectly reduces the spurious switching in some of the subsequent stages of the adders in the First Stage Adder Circuit 4, the reduction of the spurious switching may not be significant for three reasons. First, with the Latch placed at the output instead of the input, some spurious switching does occur within the internal nodes of the adder. Second, because not all the outputs of the adders in one row are connected to the inputs of the following row of adders (in particular in Tree-based First Stage Adder Circuits), but are instead also connected to the inputs of some adders in other rows, substantial spurious switching may still occur in the adders of these other rows. This is because the input signals to the adder of these other rows are poorly synchronized. Third, some further spurious switching may occur because of the way the Quasi-Domino Dynamic Full Adder operates. During the de-assert phase, the output of the Quasi-Domino Dynamic Full Adder is floating. Consequently, the output may change state (logic high to logic low) if the charge at the output node leaks away (where the clock rate is slow). This change in state may inadvertently initiate some spurious switching. A pertinent observation of this Quasi-Domino Dynamic Full Adder design is the placement of its internal Latch—at the output of the Adder—and that the internal Latch latches the output signal.

In summary, the abovementioned methods attempt to reduce spurious switching either by appropriately timing the input signals (by means of simultaneously latching the input signals, that is synchronizing the inputs) using Latches (or other similar logic circuits) that are separate circuit entities to (that is separate of) the Adders or by an internal Latch (internal to the Adders) to latch the output signal. In the former method, the overheads for realizing these timing adjustments are high, thereby defeating the advantages of reduced spurious switching. In the latter method, the amount of reduced spurious switching is low.

Furthermore, all the abovementioned methods or proposals are intended for synchronous digital logic circuits only and their application to asynchronous logic circuits is uncertain. A good description of synchronous logic circuits and asynchronous logic circuits can be found in a book authored by Dally and Poulton and entitled *Digital Systems Engineering*, Cambridge University Press, 1998.

It is of interest to note that the computation process of a Parallel Divider is similar to that of a Parallel Multiplier. Instead of a series of addition processes in a multiplication, a division performed by a Parallel Divider involves a series of subtraction processes. As mentioned earlier, a subtraction is simply by an addition (by means of adders) with simple modifications to the inputs. If the arrival time of the input signals to these adders (with modifications to the inputs) are poorly synchronized, a significant amount of spurious switching results. In this case, the power dissipation in a Parallel Divider increases. Put simply, the spurious switching in prior-art Parallel Multipliers similarly occur in prior-art Parallel Dividers.

Hence, it would be highly desirable to have synchronous logic-based and/or asynchronous logic-based Parallel Multipliers (and/or Parallel Dividers) with reduced spurious switching in the First Stage Adder Circuit 4 and/or with reduced spurious switching in the Final Stage Adder Circuit 5, wherein the reduced spurious switching in the First Stage Adder Circuit 4 and/or Final Stage Adder Circuit 5 is obtained with little overhead costs resulting from a small amount of added hardware dissipating less power than existing or prior-art methods or proposals.

SUMMARY OF THE INVENTION

The present invention seeks to provide synchronous logic and asynchronous logic Parallel Multiplier (and/or Parallel Divider) Circuits with reduced spurious switching, and the overhead cost for realizing the reduced spurious switching is low.

Accordingly, in one aspect, the present invention provides a digital Multiplier having a Partial Product Generator, a First Stage Adder Circuit and a Final Stage Adder Circuit, wherein the First Stage Adder Circuit comprises at least one Latch Adder, wherein at least one of the Latch Adder comprises at least one Latch being an integral part thereof, wherein at least one of the Latch latches an input signal.

In another aspect, the present invention provides a digital Multiplier having a Partial Product Generator, a First Stage Adder Circuit and a Final Stage Adder Circuit, wherein the Final Stage Adder Circuit having at least one Latch Adder, wherein at least one of the Latch Adder comprises at least one Latch being an integral part thereof, wherein at least one of the Latch latches an input signal.

In yet another aspect, the invention provides for a digital Divider having at least one Latch Adder circuit, wherein at least one of the Latch Adder comprises at least one Latch being an integral part thereof, wherein at least one of the Latch latches an input signal.

BRIEF DESCRIPTION OF THE DRAWINGS

Embodiments of the present invention shall now be more fully described, by way of examples, with reference to the drawings of which:

FIG. 1 is a block diagram of a prior-art general Parallel Multiplier based on synchronous logic;

FIG. 2 is a block diagram of a prior-art Full Adder;

FIG. 3 is a block diagram of a prior-art Full Adder with a Latch at each of its inputs;

FIG. 4b is a simplified block diagram of the Latch Adder of FIG. 4a;

FIG. 4c is a circuit schematic of the Latch Adder of FIG. 4a;

FIG. 5 is a circuit schematic of a Control Circuit that generates the Latch Control Signals for the Latch Adder of FIG. 4a;

DETAILED DESCRIPTION OF THE DRAWINGS

FIG. 2 depicts a block diagram of a prior-art Adder 7 of the First Stage Adder Circuit 4 of a Parallel Multiplier depicted in FIG. 1. As described earlier, this prior-art Adder 7 is usually a Carry-Save Adder. The inputs to the Adder 7 are a Partial Product A 21, a Partial Product B 22, and a Carry-in ($C_{in}$) 23. The outputs from the Adder 7 are Sum (S) 24 and Carry-out ($C_{out}$) 25. The subscripts i and x of the Adder 7 respectively denote an $i^{th}$ row and an $x^{th}$ column of the First Stage Adder Circuit 4.

As described earlier, it is well established that the spurious switching in the First Stage Adder Circuit 4 and/or the Final Stage Adder Circuit 5 may be reduced by synchronizing the inputs to the adders in each row. It was also described earlier that several existing methods or proposals have attempted to achieve this synchronization by means of external (to the adder) Latches or other external logic circuits with similar functions. Generally, most of these prior-art methods or proposals are shown in FIG. 3 where the Latches 31 are asserted by the Latch Control Signal 32 to simultaneously latch the inputs A 21, B 22 and $C_{in}$ 23 to synchronize the inputs. However, as these Latches (or other similar logic circuits) are independent of the Adders, that is the Latches and the Adders are separate circuit entities, the added overhead cost of the Latches (or other similar logic circuits) in terms of additional hardware and added power dissipation may be exorbitant. Put differently, the additional hardware and added power dissipation costs of the external Latches (or other similar logic circuits) may instead offset or defeat the advantages gained by reduced spurious switching.

Figure 4A:
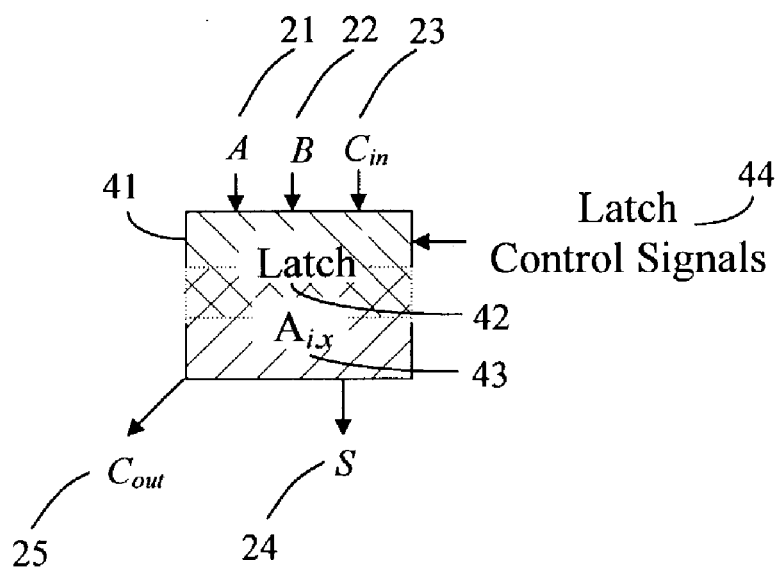
FIG. 4a is a block diagram of a Latch Adder in which a Latch Circuit Block overlaps an Adder Circuit Block to depict a Latch being an integral part of an Adder, and when applied in a Parallel Multiplier, is in accordance with the invention.

The present invention circumvents the abovementioned costs by placing the latch function as an integral part of the Adder and these Adders are henceforth termed Latch Adders, abbreviated as LA. Note that the Latch is placed at the input of Latch Adder and the Latch latches the input signals. The Latch Adder is pictorially shown in FIG. 4a in which the Latch circuit block overlaps the Adder circuit block, depicting that the Latch 42 is an integral part of the Adder 43, and depicting that the Latch 42 is placed at the input of the Adder 43. The Latch circuit block is shaded with left leaning lines, the Adder circuit block is shaded with right leaning lines, and the overlap is shaded by cross-hatching.

Figure 4B:
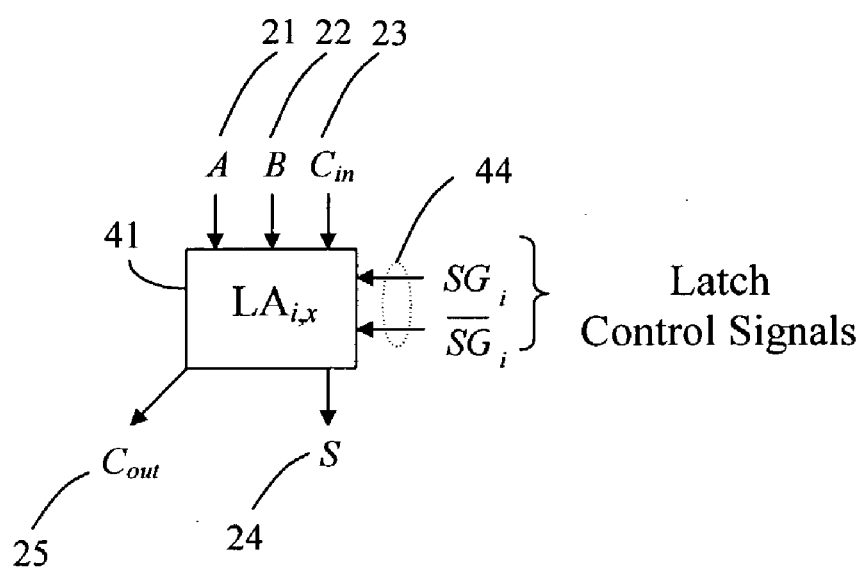

The Latch 42 is asserted by means of the Latch Control Signals 44 and the inputs to the Adder 43 within the Latch Adder are therefore made to arrive (into the Adder 43) effectively at the same time. In other words, the input signals to the Adder are now synchronized. This pictorial diagram in FIG. 4a can be simplified into the Latch Adder block depicted in FIG. 4b where the Latch 42, integrated with the Adder 43, is asserted by means of the Latch Control Signals 44. By making the Latch 42 function as an integral part of the Adder 43, as opposed to the Latch 42 and the Adder 43 being separate circuit entities, the power dissipation of the Latch Adder 41 is only marginally higher than existing prior-art Adders (without a latch function), and the circuit hardware cost is also only marginally higher. However, the full advantages of the spurious switching reduction are retained due to the synchronicity of the input signals. Put differently, by means of placing the Latch 42 as an integral part of the Adder 43, the power dissipation (due to spurious switching) may be substantially reduced and the added cost is small. It is to be noted that as the Latch 42, integrated with the Adder 43, is at the input (thereby latching the input signals) of the Latch Adder 41, there is little, if any, spurious switching within the Latch Adder 41. This is another important difference between the present invention and that proposed by Lu 1993 where in the latter, integrated Latches were placed at the output of an Adder (thereby latching the output signals).

Placing the Latch 42 within the Adder 43 is, in some sense, akin to placing (cache) memory within a microprocessor. Traditionally, a microprocessor accesses memory that is external to the microprocessor. The disadvantage of this is the slower memory access and higher power due to the long interconnections between the microprocessor and the memory. By placing some memory as an integral part of the microprocessor, called the cache memory, the memory access is faster and with lower power dissipation (for the same memory type) due to reduced interconnections. In other words, the advantages are obtained only when the cache memory is an integral part of the microprocessor and not the case when the memory and microprocessor are separate circuit entities.

Figure 4C:
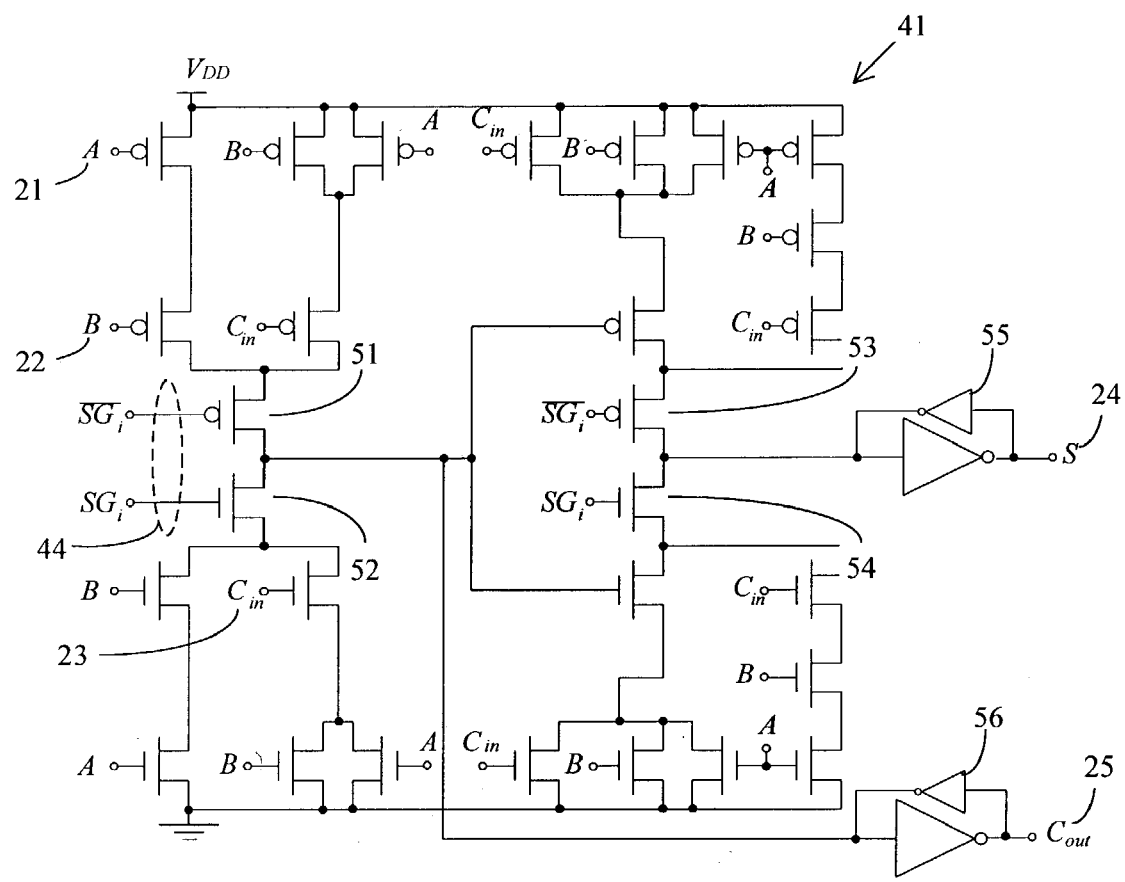

FIG. 4c depicts a Latch Adder and when employed in a Multiplier, the Multiplier is an embodiment of the invention. When the control transistors 51,52,53,54, are asserted by the Latch Control Signals $SG_i$ and $\overline{SG_i}$ 44, the Latch Adder 41 functions as a Full Adder whose inputs are A 21, B 22 and $C_{in}$ 23 and outputs are S 24 and $C_{out}$ 25. When control transistors 51,52,53,54, are negated (de-asserted) by the Latch Control Signals $SG_i$ and $\overline{SG_i}$ 44, the input signals A 21, B 22 and $C_{in}$ 23 are blocked (that is ignored by the Latch Adder 41) and the states of the previous S 24 and $C_{out}$ 25 signals are respectively retained by means of inverter 55 and inverter 56. A person skilled in the art can easily redesign this Latch Adder 41 that functions as a Full Adder shown FIG. 4c to another Latch Adder that functions as a Half Adder or any combination of Full and Half Adders.

Figure 5:
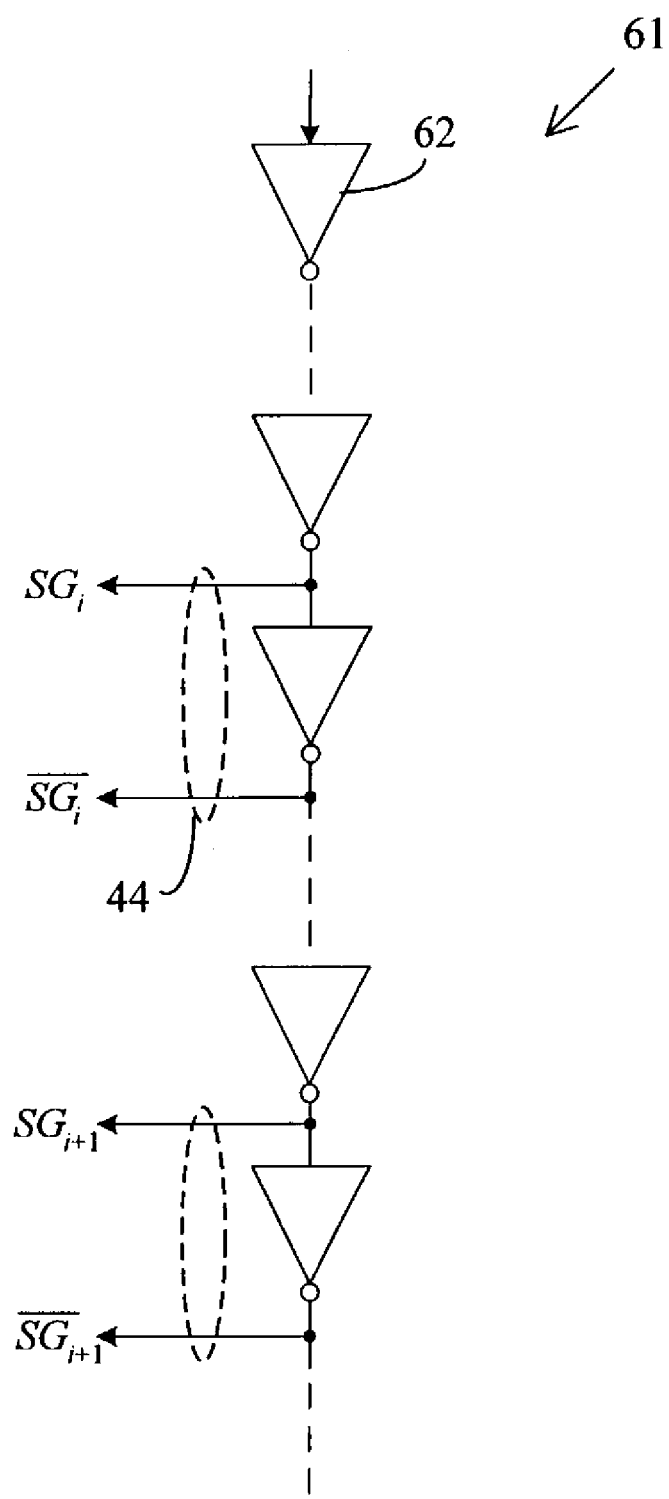

As discussed, the Latch Control Signals 44 control the synchronization of the inputs A 21, B 22 and $C_{in}$ 23 by means of the Latches within the Latch Adder 41. FIG. 5 is a circuit schematic of the Latch Control Circuit 61. This Control Circuit 61 serves two purposes—it generates the Latch Control Signals $SG_i$ and $\overline{SG_i}$ 44 and it functions as a delay circuit. The function of the Latch Control Signals $SG_i$ and $\overline{SG_i}$ 44 for the $i^{th}$ row was described hereinabove. The function of the delay circuit is to provide a delay that is equal in duration to the longest time of the Latch Adder 41 in the preceding row (that is the $i^{th}$ row) to complete its addition of inputs A 21, B 22 and $C_{in}$ 23 and to output S 24 and $C_{out}$ 25. After this delay, the Latch Control Signals $SG_{i+1}$ and $\overline{SG_{i+1}}$ (for the subsequent row, that is the $(i+1)^{th}$ row) are generated and used to control the synchronization of the inputs A 21, B 22 and $C_{in}$ 23 to all the Latch Adders 41 in the $(i+1)^{th}$ row, thereby reducing the spurious switching. It is well known that the duration of the delay of the Control Circuit 61 comprising a number of inverters, is determined by the number of inverters 62 and by the aspect ratio of the transistors in these inverters 62. A person skilled in the art can design the Control Circuit 61 in a number of ways, including using other types of logic gates.

Figure 6:
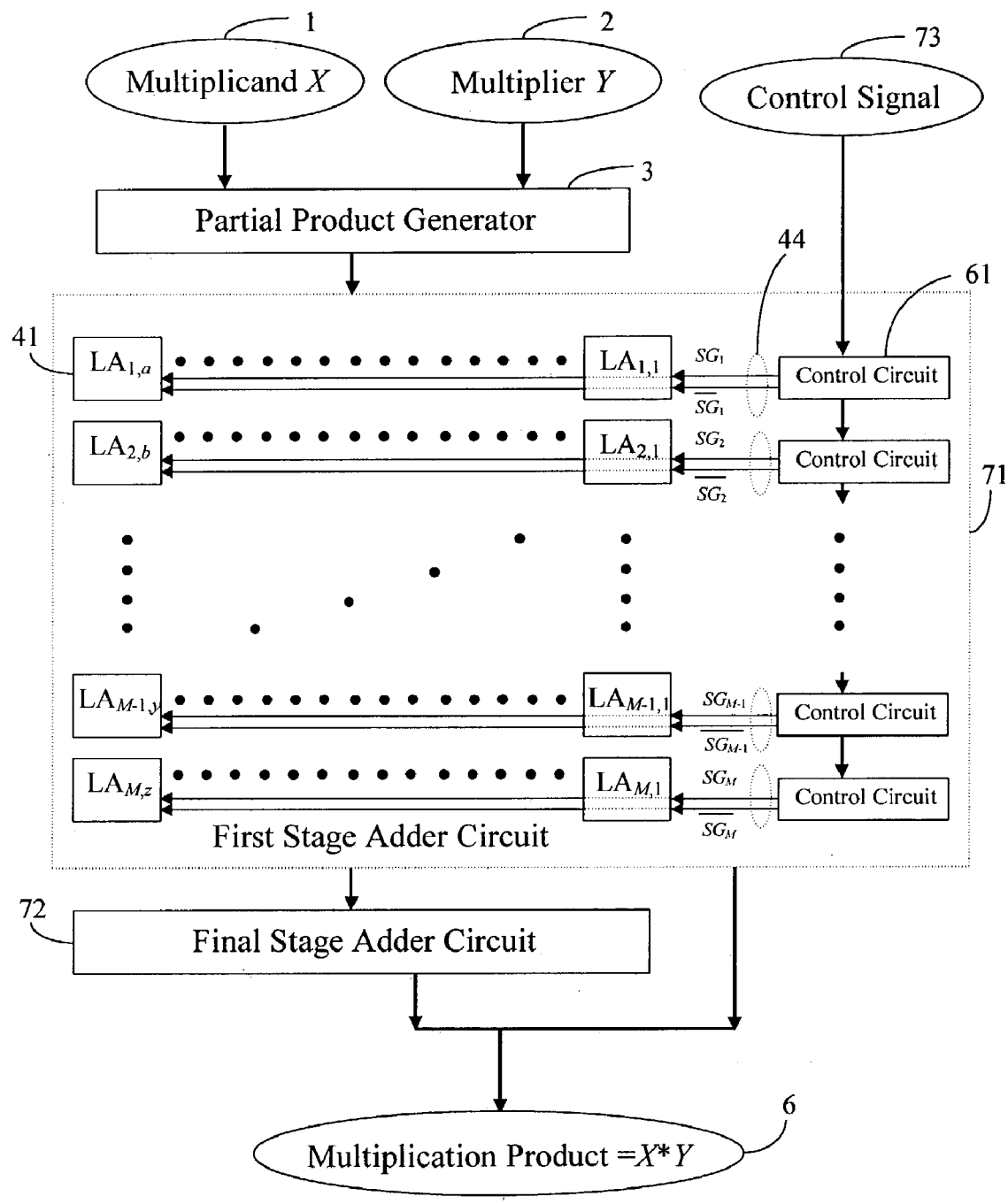
FIG. 6 is a block diagram of a general synchronous logic Parallel Multiplier with reduced spurious switching in accordance with the present invention.

FIG. 6 is a general block diagram of a synchronous logic Parallel Multiplier, an embodiment of the invention. This general Parallel Multiplier block diagram encompasses both the Parallel Array Multiplier and the Parallel Tree Multiplier where their respective First Stage Adder Circuit 71 is an array-based structure and a tree-based structure. In the First Stage Adder Circuit 71, the Adders in the First Stage Adder Circuit of prior-art Adders 7 (usually Carry-Save Adders) in FIG. 1, are now replaced by Latch Adders 41. Each of the Latch Adders 41 in the same $i^{th}$ row may be controlled by the same Latch Control Signals $SG_i$ and $\overline{SG_i}$ 44 for $1 \leq i \leq M$, where M is the number of rows in the First Stage Adder Circuit 71. The Control Circuit 61 in the first row, is activated by Control Signal 73, which is usually the active clock edge of the synchronous clock signal. When the Control Circuits 61 assert the Latch Control Signals 44, all the Latch Adders 41 in the same row are activated and the addition processes for that entire row are simultaneously initiated. In other words, the timing of the different input signals A 21, B 22 and $C_{in}$ 23 to all Latch Adders 41 in the same row is effectively synchronized.

When the Control Circuit 61 negates the Latch Control Signals 44, all the Latch Adders 41 in that row ignore their inputs and hold their previous output states. As the output of all Latch Adders 41 in that row remain unchanged, the input signals to the adders in the row immediately below remain unchanged. Similarly, the inputs of other rows connected to any output of Latch Adders 41 in that row also remain unchanged. Consequently, the spurious switching is substantially reduced.

As the Latch Adders 41 require only one switching in each operation, they therefore dissipate substantially lower power than the prior-art dynamic CMOS adders and ECDL adders. This is because, as previously discussed, prior-art dynamic CMOS adders and ECDL adders usually require more than one switching for each operation. It is reiterated that the substantial power savings from the invention is marginally reduced due to the power dissipation of the Control Circuits 61 and the slight increase in power dissipation of the Latch Adders 41 over the conventional prior-art Adder 7 that is usually the Carry-Save Adder.

For 16×16 bit Multipliers whose Partial Product Generator 3 is based on the Booth algorithm, the overall power saving of an synchronous logic Parallel Multiplier embodying the invention is of the order of 30% over prior-art conventional 16×16 bit synchronous logic Parallel Multipliers. This overall magnitude of the power saving differs for other 16×16 bit Multipliers whose Partial Product Generator 3 is based on different methodologies. The overall magnitude of the power saving is more substantial for larger Multipliers, for example 32×32 bit Parallel Multipliers. This invention can also be applied to the Final Stage Adder Circuit 72 to reduce the spurious switching.

It is possible to further improve the power savings of a synchronous logic Parallel Multiplier embodying the invention by strategically placing the Latch Adders 41 and the Control Circuits 61 in the First Stage Adder Circuit 71 instead of the abovementioned method. The abovementioned method simply involved replacing all the prior-art conventional adders 7 in the First Stage Adder 4 in FIG. 1 with Latch Adders 41 and placing the Control Circuits 61 in every row of the First Stage Adder 71. One improvement is to replace the conventional Adders 7 with Latch Adders 41 only from the second row to the last row in the First Stage Adder Circuit 71. In this improved method, the Control Circuit 61 is also placed from the second row to the last row. The first row remains unchanged from the conventional designs, that is conventional Adders 7 are used. In this improved design, the overheads are slightly reduced.

Another improvement would be to replace the conventional Adders 7 with Latch Adders 41 only in the odd rows of the First Stage Adder Circuit 71. Here, the Control Circuit 61 is also placed only in the odd rows of the First Stage Adder Circuit 4. In this improved design, the overheads are further reduced.

Figure 7:
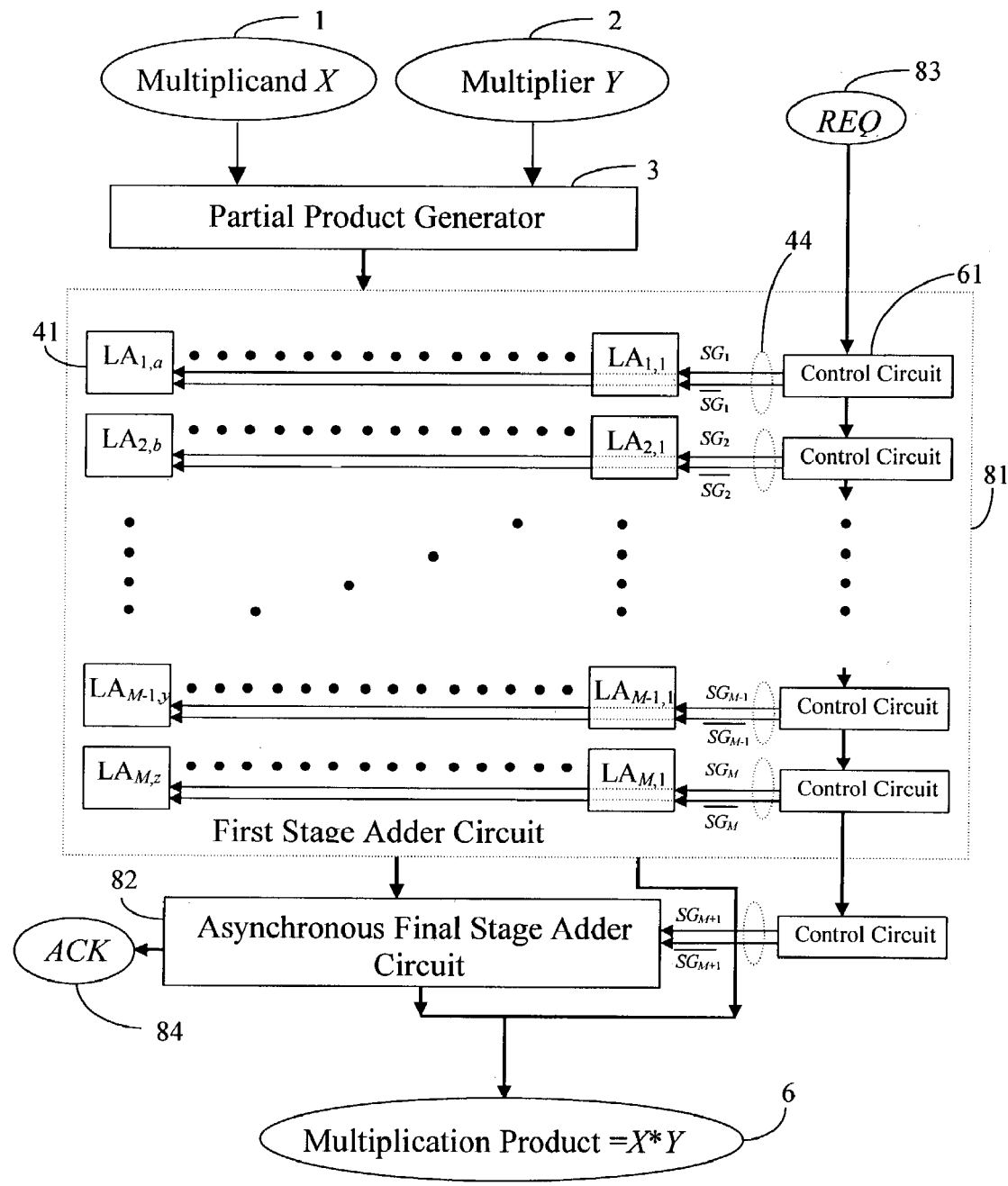
FIG. 7 is a block diagram of a general asynchronous logic Parallel Multiplier with reduced spurious switching in accordance with the present invention.

It should be clear that a person skilled in the art can easily apply the invention to a Parallel Multiplier based on asynchronous logic. FIG. 7 is a block diagram of such an asynchronous logic Parallel Multiplier. An asynchronous logic Parallel Multiplier typically requires two signals in addition to those required by conventional synchronous logic Multipliers. These signals usually include the Request (REQ) signal 83 and Acknowledge (ACK) signal 84 and these signals serve as handshaking signals. In this asynchronous logic Multiplier example, the First Stage Adder Circuit 81 comprises rows embodying the Latch Adders 41 and Control Circuits 61. The workings of the First Stage Adder Circuit 81 of this asynchronous logic Parallel Multiplier is similar to that of the synchronous logic Parallel Multiplier abovementioned. The REQ signal 83 is asserted after the input Multiplicand X 1 and Multiplier Y 2 signals have arrived. The ACK signal 84 at the output of the asynchronous Final Stage Adder Circuit 82 is asserted to indicate the completion of the multiplication process. As in the abovementioned synchronous logic Parallel Multiplier, the spurious switching in the First Stage Adder Circuit 81 of this asynchronous logic Parallel Multiplier may be substantially reduced by replacing the prior-art conventional Adders 7 in FIG. 1 with Latch Adders 41. Similarly, the adders in the Final Stage Adder Circuit 82, may also be replaced with Latch Adders 41 to reduce the spurious switching.

It should be clear that a person skilled in the art can design the Latch Adders 41 in a number of ways wherein the Latch 42 is an integral part of the Adder 43 and are not separate circuit entities. It should be also be clear that the Latch Adder 41 described herein can be applied in many logic circuit applications, including as a stand-alone Adder, a stand-alone Subtractor (realized with simple modifications to the inputs of the Latch Adder 41), in Multipliers, Dividers, etc. It should also be clear that a person skilled in the art can design a Parallel Multiplier by using a number of different methodologies for realizing the Partial Product Generator 3 including Booth algorithm, modified Booth algorithm, Baugh-Wooley algorithm, etc, and with the First Stage Adder Circuit, embodying Latch Adders 41. The different methodologies may further include a First Stage Adder Circuit whose number of rows may be increased or decreased and the number of adders in the rows may also be increased or decreased when compared to the examples given herein. It should also be clear that a person skilled in the art can design a Parallel Multiplier using a number of different designs for realizing the Final Stage Adder Circuit including the Carry-Ripple Adder, Carry-Look-ahead Adder, Carry-Skip Adder, etc, and replacing any of these prior-art adders with a Latch Adder 41.

It should further be clear that a person skilled in the art can design the Latch Control Circuit described herein in a number of different ways, and design the Latch Control Signals to be generated in a number of different ways, including without the need for a specific Control Circuit, and simplify the Control Signals from a differential signal to a single-ended signal. It should further be clear that a person skilled in the art can design both unsigned and signed Multipliers embodying the invention.

It should yet be clear for a person skilled in the art that as the computation process for a Parallel Divider is similar to that of a Parallel Multiplier, the power dissipation of a Parallel Divider can be substantially reduced (by means of reducing the spurious switching) by embodying the invention.

Having described the above embodiments with reference to the accompanying drawings, it is to be understood that the invention is not limited to these embodiments and that various changes and modifications can be made by one skilled in the art without departing from the spirit and scope of the novel concepts of the invention as defined in the appended claims.

The invention claimed is:

1. A digital Multiplier having a Partial Product Generator, a First Stage Adder Circuit and a Final Stage Adder Circuit, wherein said First Stage Adder Circuit comprises at least one Latch Adder, wherein said at least one Latch Adder comprises at least one Latch being an integral part thereof, wherein said at least one Latch is placed at the input of said at least one Latch Adder, wherein said at least one Latch latches an input signal.

2. A digital Multiplier set forth in claim 1, wherein at least two input signals of said input signal to said at least one Latch Adder are synchronized by means of said at least one Latch.

3. A digital Multiplier set forth in claim 2, wherein upon synchronizing of said at least two input signals, spurious switching is reduced.

4. A digital Multiplier set forth in claim 1, wherein said at least one Latch Adder is controlled by at least one Control Signal.

5. A digital Multiplier set forth in claim 4, wherein said at least one Control Signal is generated by at least one Control Circuit.

6. A digital Multiplier set forth in claim 5, wherein said at least one Control Circuit is a Delay Circuit.

7. A digital Multiplier set forth in claim 1, wherein at least one row in said First Stage Adder Circuit comprises said at least one Latch Adder.

8. A digital Multiplier having a Partial Product Generator, a First Stage Adder Circuit and a Final Stage Adder Circuit, wherein said Final Stage Adder Circuit comprises at least one Latch Adder, wherein said at least one Latch Adder comprises at least one Latch being an integral part thereof, wherein said at least one Latch is placed at the input of said at least one Latch Adder, wherein said at least one Latch latches an input signal.

9. A digital Multiplier set forth in claim 8, wherein at least two input signals of said input signal to said at least one Latch Adder are synchronized by means of said at least one Latch.

10. A digital Multiplier set forth in claim 9, wherein upon synchronizing of said at least two input signals, spurious switching is reduced.

11. A digital Multiplier set forth in claim 8, wherein said at least one Latch Adder is controlled by at least one Control Signal.

12. A digital Multiplier set forth in claim 11, wherein said at least one Control Signal is generated by at least one Control Circuit.

13. A digital Multiplier set forth in claim 12, wherein said at least one Control Circuit is a Delay Circuit.

14. A digital Divider having at least one Adder circuit, wherein at least one of said Adder circuit comprises at least one Latch Adder, wherein at least one of said Latch Adder comprises at least one Latch being an integral part thereof, wherein said at least one Latch is placed at the input of said at least one Latch Adder, wherein said at least one Latch latches an input signal.

15. A digital Divider set forth in claim 14, wherein at least two input signals of said input signal to said at least one Latch Adder are synchronized by means of said at least one Latch.

16. A digital Divider set forth in claim 15, wherein upon synchronizing of said at least two input signals, spurious switching is reduced.

17. A digital Divider set forth in claim 14, wherein said at least one Latch Adder is controlled by at least one Control Signal.

* * * * *